United States Patent Office 2,944,537
Patented July 12, 1960

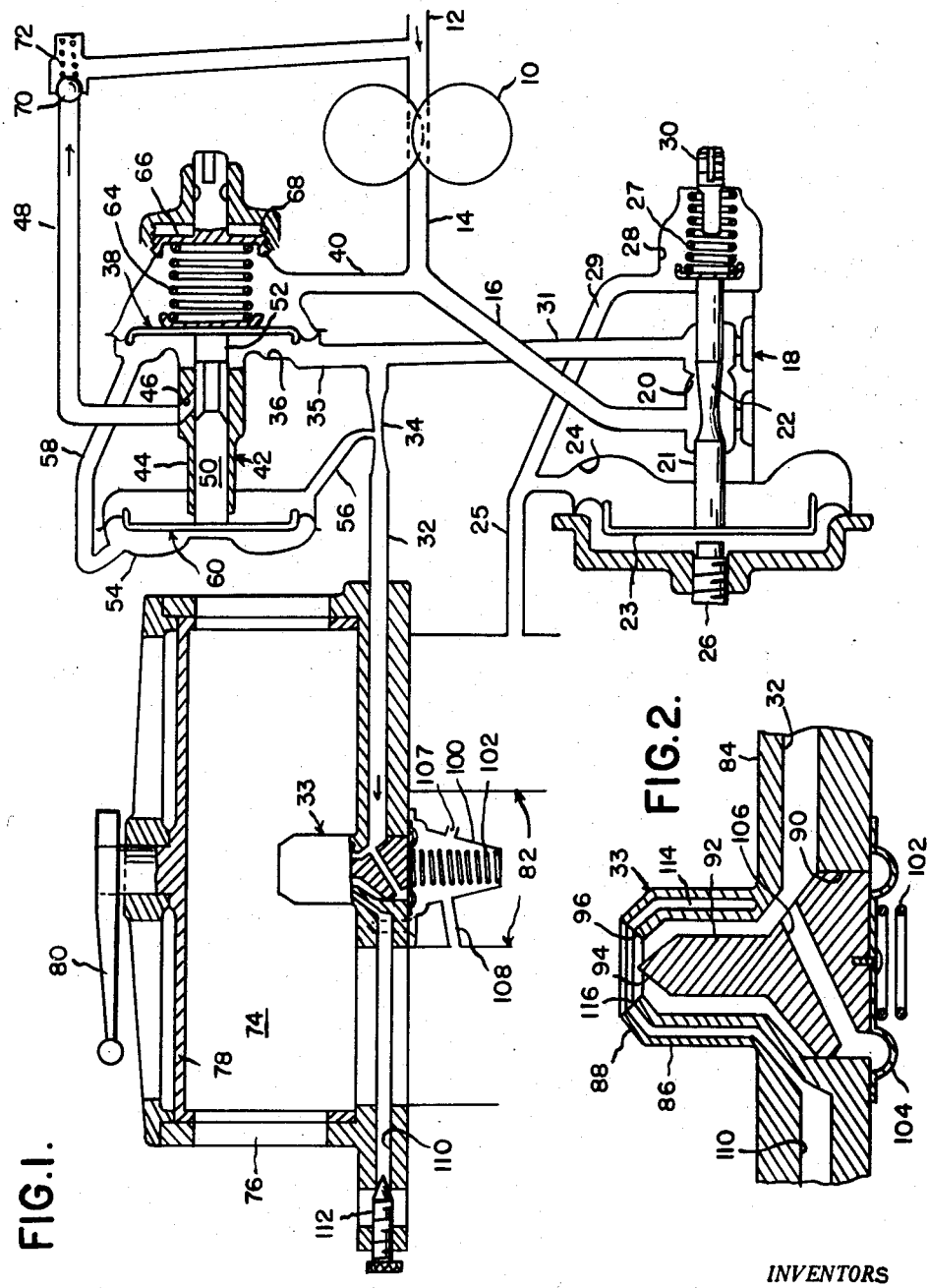
INVENTORS
GEORGE B. STROH
RAYMOND L. ENSINGER
WARREN H. COWLES

2,944,537

PRESSURE CARBURETOR

George B. Stroh, Raymond L. Ensinger, and Warren H. Cowles, Detroit, Mich., assignors to Holley Carburetor Company, Detroit, Mich., a corporation of Michigan Filed Aug. 15, 1955, Ser. No. 528,195

27 Claims. (Cl. 123—119)

The present invention relates to a pressure carburetor, and more particularly to apparatus for metering fuel under pressure to an internal combustion engine as a function of variables dependent upon engine operation such for example as engine speed and intake manifold pressure.

It is an object of the present invention to provide a carburetor characterized in that when applied to an engine it increases the overall height of the power plant less than in existing systems, thus allowing a reduction in the height of an automobile hood.

It is a further object of the present invention to provide a carburetor in which fuel is sprayed under higher pressure and will therefore mix more thoroughly with incoming air, thus effecting better atomization.

It is a further object of the present invention to provide a fuel flow-manifold pressure relationship which may be easily controlled and changed by proper design of the contour of the load valve.

It is a further object of the present invention to provide a carburetor delivering fuel at relatively high pressure, thus eliminating vapor lock.

Other objects and features of the invention will become apparent as the description proceeds, especially when taken in conjunction with the accompanying drawings, wherein:

Figure 1 is a diagrammatic view of the carburetor and control instrumentalities connected thereto, with certain parts being shown in section.

Figure 2 is an enlarged vertical sectional view through the variable area nozzle employed in the present system.

Described in general terms without reference to the drawing, the invention comprises a positive displacement pump driven by the engine and adapted to deliver fuel to the system at a rate proportional to engine speed. This fuel passes through a load valve and then to diverging passages, one of which leads to the engine through a fuel venturi, and the other of which is a by-pass to return fuel to the pump. Engine manifold pressure is employed to regulate the load valve to provide a pressure drop across the load valve dependent on engine manifold pressure. Thus, at any given manifold pressure, the pressure drop across the load valve is determined by the speed of the engine and fuel pump. Accordingly, the actual pressure drop across the load valve is a function of both engine speed and manifold pressure or engine load.

The pressure drop across the load valve is employed to control the position of a by-pass valve controlling flow through the by-pass passage. When the by-pass valve is completely closed, all of the fuel passing the load valve necessarily flows through the venturi to the engine. An increase in the pressure drop across the load valve tends to close the by-pass valve, thus forcing more fuel through the venturi to the engine. External connections are provided between the inlet and throat of the venturi and thus afford a pressure differential dependedent upon flow through the venturi. This differential pressure is also applied to the by-pass valve in opposition to the differential pressure across the load valve which is also applied to regulate the by-pass valve.

A light spring is provided tending to move the by-pass valve toward closed position and is operable at low speed conditions to give a richer mixture at idle. The effectiveness of this spring is so small that it may be disregarded under conditions other than idle. Disregarding the effectiveness of the aforementioned spring, the by-pass valve is positioned in an equilibrium position dependent upon the pressure differential across the load valve as opposed by the pressure differential from the inlet to the throat of the venturi and when these differential pressures are equal or at a predetermined relative value, the by-pass valve assumes an equilibrium position. At this time fuel passing to the engine will exactly satisfy the speed and load requirements by the action of the by-pass valve.

Fuel passes to the manifold through a variable area nozzle having a nozzle valving element including spring means tending to close the openings through the nozzle and a diaphragm or the like connected to the valving element and responsive to fuel pressure to open the nozzle. Thus, until fuel is delivered to the nozzle at a pressure sufficient to effect efficient operation, fuel is prevented from entering the manifold.

With the foregoing general description of the operation in mind reference is now made to the drawing. In Figure 1 a fuel pump is diagrammatically illustrated at 10 adapted to draw fuel from a supply passage 12. Fuel from the pump 10 passes through a passage 14 to a branch passage 16 leading to a load valve indicated generally at 18. The load valve includes a port 20 associated with a regulating valve member 21 having a tapered portion indicated at 22 extending through the port and adapted to provide therewith a restricted annular orifice dependent upon the position of the valve member 21.

Connected to the valve 21 is a flexible diaphragm construction 23 located in a chamber 24. Connected to the chamber 24 at one side thereof is a passage 25 connected to the manifold of the engine and subjected thereby to manifold vacuum. The other side of the chamber 24 is subjected to atmospheric pressure. Preferably, an adjustable abutment 26 is provided against which the flexible diaphragm construction seats when the engine is not in use.

The position of the regulating valve is thus dependent on manifold pressure or engine load, and the valve is therefore also referred to herein as a load valve.

At its other end the valve 21 is engaged by a compression spring 27 normally biasing valve 21 towards closed position. The spring 27 is located within a chamber 28 connected to a source of manifold vacuum by passage 29. An adjustable abutment 30 limits movement of the valve member 21 to the right.

A passage 31 is connected to the valve 18 and in turn connects to a passage 32 leading to the nozzle indicated generally at 33. The passage 32 includes a venturi 34.

The passage 31 also connects to a passage 35 leading to one side of a chamber 36 in which a flexible diaphragm construction indicated generally at 38 is provided. The passage 14 leading from the fuel pump 10 also connects to a passage 40 leading to the other side of the chamber 36. Thus, the flexible diapragm construction 38 is subjected at the right hand side as seen in Figure 1, to pressure existing at the upstream side of the load valve 18 and is subjected at the left hand side as seen in this figure to the pressure existing at the downstream side of the load valve 18. In other words, the flexible diaphragm construction 38 is subjected to a pressure differential equal to the pressure drop across the load valve 18.

A by-pass valve 42 is provided including a tubular body 44 having a passage 46 extending therefrom and connected to a by-pass passage 48. Slidable longitudinally in the valve body 44 is a valve member 50 including a valving portion 52 cooperable with one end of the valve body 44 to define therewith a restricted annular passage through which fuel may flow from the downstream side of the load valve 18 to the by-pass passage 48.

A second diaphragm chamber 54 is provided connected at one side through a passage 56 to the throat of the venturi 34 and connected through another passage 58 to chamber 36 which is in turn connected to passage 35. Thus in effect, passage 58 connects the left hand side of the chamber 54 to the inlet to the venturi. Located within the chamber 54 is a flexible diaphragm construction indicated generally at 60 and as a result of the connections just described, the flexible diaphragm construction 60 is subjected to pressure differences equal to the pressure drop from the inlet to the throat of the venturi 34. The flexible diaphragm construction 60 is connected to valve member 50. Accordingly, valve member 50 is movable to equilibrium positions by forces developed as a result of pressure drop across the load valve 18 and pressure drop from the inlet to the throat of the venturi 34. When these forces are brought into equilibrium and the by-pass valve reaches a position of rest, the fuel passing to the engine will exactly fit the speed-load requirements of the engine.

A light idle spring 64 is provided in the chamber 36 acting between an adjustable spring seat 66 and the flexible diaphragm construction 38 tending to urge valve 50 to the left as seen in Figure 1, or in other words, in a direction tending to close valve 42 or prevent by-pass flow of fuel. Spring seat 66 is preferably adjustable as indicated by its threaded connection 68 within the chamber 36. The effectiveness of the spring 64 is very low and it is operable chiefly to retain valve 50 closed when the engine is not operating and to maintain it substantially closed under idle conditions. Under conditions other than idle the effectiveness of the spring 64 is so small as compared to forces developed on the diaphragm constructions 38 and 60 as to be negligible.

By-pass passage 48 includes a check valve 70 urged to the closed position illustrated in Figure 1 by a light spring 72. The valve 70 also operates to reduce the pressure drop across the by-pass valve 50 and also reduces leakage under starting and idle conditions.

The carburetor comprises a mixing chamber 74 into which the nozzle 33 discharges. Air enters the mixing chamber 74 through ports 76 which are adapted to be closed by a rotary throttle device 78 having an operating arm 80. Fuel and air mixture flows from the mixing chamber 74 through passages 82 to the engine manifold.

Referring now to Figure 2, which illustrates the nozzle 33 on an enlarged scale, it will be observed that the nozzle includes a portion 84 through which the fuel supply passage 32 extends. The nozzle includes an upstanding tubular portion 86 terminating in an upwardly and inwardly inclined portion 88. The nozzle portion 84 includes a chamber 90 in which is vertically movable a nozzle valve element 92 having an upwardly extending conical pointed portion 94 cooperating with the reduced opening 96 provided at the upper end of the portion 86 of the nozzle to regulate flow of fuel therethrough. As best seen in Figure 1, the nozzle construction is provided with a depending housing 100 in which is included a spring 102, the spring bearing against the lower end of the nozzle valving element 92 and urging it upwardly to a position in which the conical pointed portion 94 will close the opening 96 through the nozzle. The nozzle valving element 92 is connected to a flexible diaphragm 104 and the valving element is provided with a passage 106 through which fuel flows to act against the upper surface of the diaphragm 104. The strength of the spring is such that the nozzle valving element 92 remains in closed position until the fuel pressure within the passage 32 and acting on the upper surface of the diaphragm 104 reaches some predetermined value as for example 15–20 pounds per square inch.

This is a pressure sufficient to produce efficient atomization of the fuel and admixture with air. The underside of the flexible diaphragm 104 may be subjected to atmospheric pressure through a port 107 or alternatively, it may be subjected to the sub-atmospheric manifold vacuum through a conduit 108. At this time fuel pressure moves the fuel valving element 92 downwardly and permits fuel to be sprayed under pressure into the mixing chamber. In order to effect the proper admixture of fuel and air under idle conditions, the carburetor includes an idle air bleed comprising a passage 110 controlled by a needle valve 112. As best seen in Figure 2, air admitted through the passage 110 passes into an annular passage 114 from which it is drawn through annular port 116 to effect efficient mixture with the fuel.

The drawings and the foregoing specification constitute a description of the improved pressure carburetor in such full, clear, concise and exact terms as to enable any person skilled in the art to practice the invention, the scope of which is indicated by the appended claims.

What we claim as our invention is:

1. A pressure carburetor for an internal combustion engine having a manifold comprising a mixing chamber, a nozzle in said chamber, a positive displacement fuel pump operable in accordance with engine speed, passage means connecting said pump and nozzle, a by-pass passage connected to said passage means and dividing it into a pump outlet passage and an engine supply passage, a by-pass valve in said by-pass passage, first means responsive to discharge from flow from said pump connected to said by-pass valve to apply a closing bias thereto, second means responsive to flow through said engine supply passage connected to said by-pass valve to apply an opening bias thereto, and means for varying the effectiveness of said first means in accordance with manifold vacuum.

2. A pressure carburetor for an internal combustion engine having a manifold comprising a mixing chamber, a nozzle in said chamber, a positive displacement fuel pump operable in accordance with engine speed, passage means connecting said pump and nozzle, a by-pass passage connected to said passage means and dividing it into a pump outlet passage and an engine supply passage, a by-pass valve in said by-pass passage, first means directly responsive to discharge from flow from said pump connected to said by-pass valve to apply a closing bias thereto, second means directly responsive to flow through said engine supply passage connected to said by-pass valve to apply an opening bias thereto, and means for varying the effectiveness of said first means inversely in accordance with manifold vacuum.

3. A pressure carburetor for an internal combustion engine having a manifold comprising a mixing chamber, a nozzle in said chamber, a positive displacement fuel pump operable in accordance with engine speed, passage means connecting said pump and nozzle, a by-pass passage connected to said passage means and dividing it into a pump outlet passage and an engine supply passage, a by-pass valve in said by-pass passage, first means directly responsive to discharge from flow from said pump connected to said by-pass valve to apply a closing bias thereto, second means directly responsive to flow through said engine supply passage connected to said by-pass valve to apply an opening bias thereto, resilient means connected to said by-pass valve to apply a closing bias thereto of a value which is negligible except at idle operation, and means for varying the effectiveness of said first means inversely in accordance with manifold vacuum.

4. A pressure carburetor for an internal combustion engine having a manifold comprising a mixing chamber, a nozzle in said chamber, a fuel pump operable in accordance with engine speed, passage means connecting said pump and nozzle, a by-pass passage connected to said passage means and dividing it into a pump outlet passage and an engine supply passage, regulating means for the by-pass valve to determine the proportion of fuel delivered by said pump which passes to said nozzle, said regulating means comprising means for establishing a first pressure differential variable directly with engine speed and inversely with manifold vacuum, means responsive to said first pressure differential operably connected to said by-pass valve to bias it toward closed position, means for establishing a second pressure differential variable directly with the rate of supply of fuel to said nozzle, and means responsive to said second pressure differential operably connected to said by-pass valve to bias it toward open position.

5. A pressure carburetor for an internal combustion engine having a manifold comprising a mixing chamber, a nozzle in said chamber, a fuel pump operable in accordance with engine speed, passage means connecting said pump and nozzle, a by-pass passage connected to said passage means and dividing it into a pump outlet passage and an engine supply passage, regulating means for the by-pass valve to determine the proportion of fuel delivered by said pump which passes to said nozzle, said regulating means comprising means for establishing a first pressure differential variable directly with engine speed and inversely with manifold vacuum, means responsive to said first pressure differential operably connected to said by-pass valve to bias it toward closed position, means for establishing a second pressure differential variable directly with the rate of supply of fuel to said nozzle, means responsive to said second pressure differential operably connected to said by-pass valve to bias it toward open position, and a light spring biasing said by-pass valve toward closed position and having a force which is negligible compared to said pressure differentials except under idle conditions.

6. A pressure carburetor for an internal combustion engine having a manifold and a valved induction passage including a mixing chamber, a nozzle in said chamber, a fuel pump operated at a rate dependent on engine speed, a pump outlet passage, said passage being divided into two passages to provide an engine fuel supply passage connected to said nozzle and a bypass passage, a variable orifice regulating valve in said outlet passage, a movable bypass valve in said bypass passage operable to control the division of fuel between said engine supply passage and said bypass passage, means responsive to manifold pressure connected to said regulating valve to control the orifice of said valve, and means responsive to pressure drop across said regulating valve connected to said bypass valve to apply a variable bias thereto dependent on engine speed and manifold pressure.

7. A pressure carburetor for an internal combustion engine having a manifold and a valved induction passage including a mixing chamber, a nozzle in said chamber, a positive displacement fuel pump operated at a rate dependent on engine speed, a pump outlet passage, said passage being divided into two passages to provide an engine fuel supply passage connected to said nozzle and a bypass passage, a variable orifice regulating valve in said outlet passage, a movable bypass valve in said bypass passage operable to control the division of fuel between said engine supply passage and said bypass passage, means responsive to manifold pressure connected to said regulating valve to control the orifice of said valve, and means responsive to pressure drop across said regulating valve connected to said bypass valve to apply a variable bias thereto dependent on engine speed and manifold pressure.

8. A pressure carburetor for an internal combustion engine having a manifold and a valved induction passage including a mixing chamber, a nozzle in said chamber, a positive displacement fuel pump operated at a rate dependent on engine speed, a pump outlet passage, said passage being divided into two passages to provide an engine fuel supply passage connected to said nozzle and a bypass passage, a variable orifice regulating valve in said outlet passage, a movable bypass valve in said bypass passage operable to control the division of fuel between said engine supply passage and said bypass passage, means responsive to manifold pressure connected to said regulating valve to increase the orifice of said valve upon a decrease in manifold pressure, and means responsive to pressure drop across said regulating valve connected to said bypass valve to apply a variable bias thereto dependent on engine speed and manifold pressure.

9. A pressure carburetor for an internal combustion engine having a manifold and a valved induction passage including a mixing chamber, a nozzle in said chamber, a positive displacement fuel pump operated at a rate dependent on engine speed, a pump outlet passage, said passage being divided into two passages to provide an engine fuel supply passage connected to said nozzle and a bypass passage, a variable orifice regulating valve in said outlet passage, a movable bypass valve in said bypass passage operable to control the division of fuel between said engine supply passage and said bypass passage, means responsive to manifold pressure connected to said regulating valve to control the orifice of said valve, and means responsive to pressure drop across said regulating valve connected to said bypass valve to apply a variable valve closing bias thereto which is a direct function of the pressure drop across said regulating valve.

10. A pressure carburetor for an internal combustion engine having a manifold and a valved induction passage including a mixing chamber, a nozzle in said chamber, a positive displacement fuel pump operated at a rate dependent on engine speed, a pump outlet passage, said passage being divided into two passages to provide an engine fuel supply passage connected to said nozzle and a bypass passage, a variable orifice regulating valve in said outlet passage, a movable bypass valve in said bypass passage operable to control the division of fuel between said engine supply passage and said bypass passage, means responsive to manifold pressure connected to said regulating valve to control the orifice of said valve, means responsive to pressure drop across said regulating valve connected to said bypass valve to apply a variable bias thereto dependent on engine speed and manifold pressure, and means responsive to the rate of flow in said engine fuel supply passage connected to said bypass valve to apply a variable bias thereto.

11. A pressure carburetor for an internal combustion engine having a manifold and a valved induction passage including a mixing chamber, a nozzle in said chamber, a positive displacement fuel pump operated at a rate dependent on engine speed, a pump outlet passage, said passage being divided into two passages to provide an engine fuel supply passage connected to said nozzle and a bypass passage, a variable orifice regulating valve in said outlet passage, a movable bypass valve in said bypass passage operable to control the division of fuel between said engine supply passage and said bypass passage, means responsive to manifold pressure connected to said regulating valve to control the orifice of said valve, means responsive to pressure drop across said regulating valve connected to said bypass valve to apply a variable bias thereto dependent on engine speed and manifold pressure, and means responsive to the rate of flow in said engine fuel supply passage connected to said bypass valve to apply a variable valve opening bias thereto which increases with increased flow of fuel to said engine.

12. A pressure carburetor for an internal combustion engine having a manifold and a valved induction passage including a mixing chamber, a nozzle in said chamber, a positive displacement fuel pump operated at a rate dependent on engine speed, a pump outlet passage, said passage being divided into two passages to provide an engine fuel supply passage connected to said nozzle and a bypass passage, a variable orifice regulating valve in said outlet passage, a movable bypass valve in said bypass passage operable to control the division of fuel between said engine supply passage and said bypass passage, means responsive to manifold pressure connected to said regulating valve to control the orifice of said valve, means responsive to pressure drop across said regulating valve connected to said bypass valve to apply a variable valve closing bias thereto which is a direct function of the pressure drop across said regulating valve, and means responsive to the rate of flow in said engine fuel supply passage connected to said bypass valve to apply a variable bias thereto.

13. A pressure carburetor for an internal combustion engine having a manifold and a valved induction passage including a mixing chamber, a nozzle in said chamber, a positive displacement fuel pump operated at a rate dependent on engine speed, a pump outlet passage, said passage being divided into two passages to provide an engine fuel supply passage connected to said nozzle and a bypass passage, a variable orifice regulating valve in said outlet passage, a movable bypass valve in said bypass passage operable to control the division of fuel between said engine supply passage and said bypass passage, means responsive to manifold pressure connected to said regulating valve to control the orifice of said valve, means responsive to pressure drop across said regulating valve connected to said bypass valve to apply a variable valve closing bias thereto which is a direct function of the pressure drop across said regulating valve, and means responsive to the rate of flow in said engine fuel supply passage connected to said bypass valve to apply a variable valve opening bias thereto which increases with increased flow of fuel to said engine.

14. Apparatus for automatically controlling the flow of fuel under pressure to the fuel mixture intake system of an internal combustion engine comprising an adjustable device forming a variable orifice, means for establishing a flow of fluid through said orifice at a rate which is a direct function of engine speed, means connected to said device and responsive to pressure in said fuel mixture intake system for adjusting said device, a fuel pump, an engine fuel supply passage connected to receive fuel from said pump and extending to the fuel intake system of the engine, a bypass passage connected to said supply passage, a bypass valve in said bypass passage, and first means connected to said bypass valve and responsive to the pressure drop across said orifice for adjusting said bypass valve.

15. Apparatus for automatically controlling the flow of the fuel under pressure to the fuel mixture intake system of an internal combustion engine comprising an adjustable device forming a variable orifice, means for establishing a flow of fluid through said orifice at a rate which is a direct function of engine speed, means connected to said device and responsive to pressure in said fuel mixture intake system for adjusting said device to increase the orifice upon a decrease in engine load, a fuel pump, an engine fuel supply passage connected to receive fuel from said pump and extending to the fuel intake system of the engine, a bypass passage connected to said supply passage, a bypass valve in said bypass passage, and first means connected to said bypass valve and responsive to the pressure drop across said orifice for adjusting said bypass valve.

16. Apparatus for automatically controlling the flow of fuel under pressure to the fuel mixture intake system of an internal combustion engine comprising an adjustable device forming a variable orifice, means for establishing a flow of fluid through said orifice at a rate which is a direct function of engine speed, means connected to said device and responsive to pressure in said fuel mixture intake system for adjusting said device, a fuel pump, an engine fuel supply passage connected to receive fuel from said pump and extending to the fuel intake system of the engine, a bypass passage connected to said supply passage, a bypass valve in said bypass passage, and first means connected to said bypass valve and responsive to the pressure drop across said orifice for adjusting said bypass valve to effect opening movement of said valve in response to an increase in pressure drop across the orifice.

17. Apparatus for automatically controlling the flow of fuel under pressure to the fuel mixture intake system of an internal combustion engine comprising an adjustable device forming a variable orifice, means for establishing a flow of fluid through said orifice at a rate which is a direct function of engine speed, means connected to said device and responsive to pressure in said fuel mixture intake system for adjusting said device to increase the orifice upon a decrease in engine load, a fuel pump, an engine fuel supply passage connected to receive fuel from said pump and extending to the fuel intake system of the engine, a bypass passage connected to said supply passage, a bypass valve in said bypass passage, and first means connected to said bypass valve and responsive to the pressure drop across said orifice for adjusting said bypass valve to effect opening movement of said valve in response to an increase in pressure drop across the orifice.

18. Apparatus for automatically controlling the flow of fuel under pressure to the fuel mixture intake system of an internal combustion engine comprising an adjustable device forming a variable orifice, means for establishing a flow of fluid through said orifice at a rate which is a direct function of engine speed, means connected to said device and responsive to pressure in said fuel mixture intake system for adjusting said device, a fuel pump, an engine fuel supply passage connected to receive fuel from said pump and extending to the fuel intake system of the engine, a bypass passage connected to said supply passage, a bypass valve in said bypass passage, first means connected to said bypass valve and responsive to the pressure drop across said orifice for adjusting said bypass valve, and second means connected to said bypass valve and responsive to flow of fuel through said engine fuel supply passage for adjusting said bypass valve.

19. Apparatus for automatically controlling the flow of fuel under pressure to the fuel mixture intake system of an internal combustion engine comprising an adjustable device forming a variable orifice, means for establishing a flow of fluid through said orifice at a rate which is a direct function of engine speed, means connected to said device and responsive to pressure in said fuel mixture intake system for adjusting said device, a fuel pump, an engine fuel supply passage connected to receive fuel from said pump and extending to the fuel intake system of the engine, a bypass passage connected to said supply passage, a bypass valve in said bypass passage, first means connected to said bypass valve and responsive to the pressure drop across said orifice for adjusting said bypass valve, and second means connected to said bypass valve and responsive to flow of fuel through said engine fuel supply passage for adjusting said bypass valve to open said valve in response to an increase in flow of fuel to the engine.

20. The method of effecting fully automatic control of fuel supply to the fuel mixture intake system of an internal combustion engine which comprises establishing a variable pressure differential which is a direct function of engine speed and a direct function of pressure in said fuel mixture intake system, establishing a continuous flow of fuel, bypassing a portion of the flow and supplying the balance of said flow to the engine and regulating the flow of fuel to the engine in accordance with variations in the variable pressure differential.

21. The method of effecting fully automatic control of fuel supply to the fuel mixture intake system of an internal combustion engine which comprises establishing a variable pressure differential which is a direct function of engine speed and a direct function of pressure in said fuel mixture intake system, establishing a continuous flow of fuel, bypassing a portion of the flow and supplying the balance of said flow to the engine and regulating the flow of fuel to the engine as a direct function of the differential pressure.

22. The method of effecting fully automatic control of fuel supply to the fuel mixture intake system of an internal combustion engine which comprises establishing a variable pressure differential which is a direct function of engine speed and a direct function of pressure in said fuel mixture intake system, establishing a continuous flow of fuel at a rate which is a direct function of engine speed, bypassing a portion of the flow and supplying the balance of said flow to the engine and regulating the flow of fuel to the engine in accordance with variations in the variable pressure differential.

23. The method of effecting fully automatic control of fuel supply to the fuel mixture intake system of an internal combustion engine which comprises establishing a variable pressure differential which is a direct function of engine speed and a direct function of pressure in said fuel mixture intake system, establishing a continuous flow of fuel at a rate which is a direct function of engine speed, bypassing a portion of the flow and supplying the balance of said flow to the engine and regulating the flow of fuel to the engine as a direct function of the differential pressure.

24. The method of effecting fully automatic control of fuel supply to an internal combustion engine which comprises establishing a variable pressure differential which is a direct function of engine speed and a direct function of the pressure of combustion air supplied to the combustion chamber, establishing a continuous flow of fuel at a rate which is a direct function of engine speed, bypassing a portion of the flow and supplying the balance of said flow to the engine, and regulating the flow of fuel to the engine in accordance with variations in variable pressure differential.

25. The method of effecting fully automatic control of fuel supply to an internal combustion engine which comprising establishing a flow of fuel at a rate which is a direct function of engine speed, establishing a first pressure drop in said flow which is a function of engine speed and pressure of combustion air supplied to said engine, separating the aforesaid flow of fuel into a first flow to the engine and a second bypass flow, and regulating the bypass flow in accordance with said first pressure drop and with the rate of flow of fuel to said engine.

26. The method of effecting fully automatic control of fuel supply to an internal combustion engine which comprises establishing a flow of fuel at a rate which is a direct function of engine speed, establishing a first pressure drop in said flow which is a function of engine speed and pressure of combustion air supplied to said engine, separating the aforesaid flow of fuel into a first flow to the engine and a second bypass flow, establishing a second pressure drop in the flow of fuel to the engine variable in accordance with the rate of flow, and regulating the bypass flow of fuel in accordance with both of said pressure drops.

27. A fuel supply system for an internal combustion engine having an induction passage for combustion air, a positive displacement fuel pump operated at a rate dependent on engine speed, a pump outlet passage, said passage being divided into two branch passages, one of which is a fuel supply passage connected to the engine and the other of which is a bypass passage, a variable orifice regulating valve in said outlet passage, a movable bypass valve in said bypass passage operable to control the division of fuel between said engine supply passage and said bypass passage, means responsive to pressure within said induction passage connected to said regulating valve to control the orifice of said valve, and means responsive jointly to the volume of fuel flowing through said engine supply passage and the pressure drop across said regulating valve connected to said bypass valve to apply a variable bias thereto dependent on engine speed and pressure within said induction passage.

References Cited in the file of this patent

UNITED STATES PATENTS

| | | |
|---|---|---|
| 2,136,959 | Winfield | Nov. 15, 1938 |
| 2,305,912 | Thompson | Dec. 22, 1942 |
| 2,310,984 | Mock et al. | Feb. 16, 1943 |
| 2,422,808 | Stokes | June 24, 1947 |